3,367,863
FIRE EXTINGUISHING AGENT
William J. Cooper, Butler, and David M. Kyllonen, Pittsburgh, Pa., assignors to Callery Chemical Company, Pittsburgh, Pa., a corporation of Pennsylvania
No Drawing. Filed Oct. 29, 1965, Ser. No. 505,756
7 Claims. (Cl. 252—2)

ABSTRACT OF THE DISCLOSURE

A fire-extinguishing agent is made by heating an aqueous mixture of aluminum acid phosphate and a boron oxide source material, such as boron oxide, boric acid, an alkali and alkaline earth metal borates.

---

This invention relates to an improved fire extinguishing agent and its preparation.

Fires burning in large waste coal piles have in many localities created serious air pollution for many years. Continuing effort and trial of many elaborate and expensive methods have failed to extinguish such fires.

This invention is based on our discovery of a fire extinguishing agent that can be pumped, poured or sprayed on burning surfaces and is converted by the heat of the fire to form a coating that extinguishes the burning and prevents reignition. The adherent coating is substantially water insoluble, has good mechanical strength and is not destroyed by prolonged weathering. Since our extinguishing agent can be applied like water to reach fires in remote crevices and forms a weather resistant coating on the burning side, it is especially useful for extinguishing waste coal pile fires although it will be recognized that it may be used to advantage on other types of fires.

The extinguishing agent of this invention is a slurry formed by reaction of an aqueous mixture of an aluminum acid phosphate and a boron oxide source material. The aluminum, boron and phosphorous content of the extinguishing agent will hereinafter be expressed in terms of $Al_2O_3$, $B_2O_3$ and $P_2O_5$ content, as is customary with complex oxides of this nature. The extinguishing agent may contain between about 1 to 50 parts by weight, preferably between about 1 to 10 parts of $B_2O_3$ for each part of $Al_2O_3$, between about 1 and 50 parts, preferably between about 3 and 20 parts, of $P_2O_5$ for each part of $Al_2O_3$, and less than about 1 part, preferably between about ⅓ and 1 part, of $B_2O_3$ for each part of $P_2O_5$. Compositions within the preferred ranges yield coatings when applied to a fire that are most weather resistant.

The amount of water may be widely adjusted to modify the viscosity of the extinguishant; generally it is preferred to use at least about 2.5 parts of water for each part of oxide to give an easily pumpable slurry.

Aluminum acid phosphates (acid salts of phosphoric acid) are soluble in water. The proportions of aluminum and phosphorous in such solutions are conventionally expressed in terms of $Al_2O_3$ content and $P_2O_5$ content and may be varied to contain between 1 and 2 moles of $Al_2O_3$ for each 3 moles of $P_2O_5$. Solutions containing less than 1 mole of $Al_2O_3$ for each 3 moles of $P_2O_5$ are considered as mixtures of aluminum acid phosphate and phosphoric acid; such mixtures may be used in the practice of this invention provided the $P_2O_5$ to $Al_2O_3$ weight ratio does not exceed about 50 to 1. Commercially available monobasic aluminum acid phosphate contains about 9% $Al_2O_3$ and 33% $P_2O_5$. Other aluminum acid phosphate solutions may be readily prepared by heating $Al_2O_3$ or Al with phosphoric acid in the desired proportions.

Suitable boron oxide sources include boric oxide, boric acids, metal tetraborates and metal metaborates, any of which may be used with equal efficacy. Economically, boric oxide is not preferred as it hydrolyzes in water to form the less expensive boric acid. Alkali metal or alkaline earth metal tetraborates, such as $Na_2B_4O_7$ or $CaB_4O_7$, are generally used as they are most economical in terms of $B_2O_3$ content.

The extinguishant is prepared by mixing the aluminum acid phosphate and metal borate in water and heating the mixture, preferably with agitation, until reaction occurs. The reaction temperature varies somewhat depending on the proportions and particular components used and a temperature of about 70–90° C. is generally suitable. Higher temperatures up to the boiling point of the mixture may be used without detriment or benefit. The occurrence of the reaction is readily observable as it results in the formation of a milky white uniform dispersion of extremely finely divided solids. Alternatively, the aluminum acid phosphate may be prepared in situ as by heating a mixture of aluminum or aluminum oxide, phosphoric acid and the boron oxide source material in the desired proportions.

Illustrative of this invention, 1.96 pounds of borax ($Na_2B_4O_7$) were added to one gallon of a 50% aqueous solution of commercial monobasic aluminum acid phosphate (8.6% $Al_2O_3$, 33.1% $P_2O_5$). The $Al_2O_3:B_2O_3:P_2O_5$ ratio is about 1:1:4. The mixture was heated to 70° C. with stirring whereby a reaction occurred resulting in a milky slurry containing very finely divided dispersed solids. Over long storage, the dispersed solids may settle out slightly, but they do not agglomerate and are very readily redispersed with slight agitation.

When the aforesaid reaction product is sprayed over a burning waste coal pile, the contact with the hot surface evaporates the water leaving a foamed, continuous hard coating over the area generally conforming to the topography; that is, fully coating cracks and deep crevices. The fire is extinguished and prevented from reigniting by the coating.

The aluminum acid phosphate used in this invention need not be of high purity. For example, it can be prepared from the reaction of aluminum oxide minerals with phosphoric acid and by-products of the reaction need not be separated. To illustrate, 1 part kaolin, 1.8 parts phosphoric acid (85%) and 0.75 part water were heated to 70° C. forming a mixture containing aluminum acid phospate. 1.6 parts of borax were added to the reaction mixture and heated to 90–100° C. to form an extinguishant that had substantially the same properties as in the previous example.

The extinguishant is not sensitive to the presence of substantial amounts of extraneous salts, oxides or hydroxides. Also, wetting agents, surfactants and the like may be incorporated in the extinguishant if desired.

According to the provisions of the patent statutes, we have explained the principle and mode of practice of our invention and have described what we now consider to represent its best embodiment. However, we desire to have it understood that, within the scope of the appended claims, the invention may be practiced otherwise than as specifically described.

We claim:

1. A fire extinguishing agent consisting essentially of the reaction product formed by heating an aqueous mixture of aluminum acid phosphate and a boron oxide source material selected from the group consisting of boron oxide, boric acid, alkali metal borates and alkaline earth metal borates, said mixture having a content of from about 1–50 parts $B_2O$ per part of $Al_2O_3$, from about 1–50 parts $P_2O_5$ per part of $Al_2O_3$, and less than about 1 part of $B_2O_3$ per part of $P_2O_5$.

2. A fire extinguishing agent according to claim 1 in which the boron oxide source material is a tetraborate.

3. A fire extinguishing agent according to claim 2 in which the tetraborate is sodium tetraborate.

4. A fire extinguishing agent according to claim 1 in which the mixture has a content of between about 1–10 parts $B_2O_3$ per part of $Al_2O_3$, between about 1–20 parts $P_2O_5$ per part of $Al_2O_3$, and between about 1/3 and 1 part $B_2O_3$ per part of $P_2O_5$.

5. A method of preparing a fire extinguishing agent which comprises heating and reacting at a temperature between about 70° C. and the boiling point an aqueous mixture of aluminum acid phosphate and a boron oxide source material selected from the group consisting of boron oxide, boric acid, alkali metal borates and alkaline earth metal borates, said mixtures having a content of from about 1–50 parts $P_2O_5$ per part of $Al_2O_3$, and less than about 1 part of $B_2O_3$ per part of $P_2O_5$.

6. A method according to claim 5 wherein aluminum acid phosphate is formed in situ by reacting an aluminum oxide ore and phosphoric acid.

7. A method according to claim 6 in which the aluminum ore is kaolin.

References Cited
UNITED STATES PATENTS 1,414,609   5/1922   Wheeler _____ 252—81

LEON D. ROSDOL, *Primary Examiner.*

MAYER WEINBLATT, *Examiner.*

UNITED STATES PATENT OFFICE
CERTIFICATE OF CORRECTION

Patent No. 3,367,863                          February 6, 1968

William J. Cooper et al.

It is hereby certified that error appears in the above numbered patent requiring correction and that the said Letters Patent should read as corrected below.

Column 2, line 68, for "$B_2O$" read -- $B_2O_3$ --.

Signed and sealed this 15th day of April 1969.

(SEAL)
Attest:

Edward M. Fletcher, Jr.                      EDWARD J. BRENNER
Attesting Officer                            Commissioner of Patents